United States Patent [19]

Weis

[11] Patent Number: 4,767,532

[45] Date of Patent: Aug. 30, 1988

[54] APPARATUS FOR REMOVING GRIT

[75] Inventor: Frank G. Weis, Kansas City, Mo.

[73] Assignee: Smith & Loveless, Inc., Lenexa, Kans.

[21] Appl. No.: 53,078

[22] Filed: May 21, 1987

[51] Int. Cl.$^4$ .................... B01D 21/24; B01D 21/26
[52] U.S. Cl. .................... 210/257.1; 210/512.3; 210/523; 210/532.1
[58] Field of Search ............ 210/208, 219, 512.3, 210/519, 523, 532.1, 257.1, 801; 209/169

[56] References Cited

U.S. PATENT DOCUMENTS

| | | | |
|---|---|---|---|
| 1,053,171 | 2/1913 | Hendryx | 210/523 |
| 2,020,617 | 12/1935 | Nordell | 210/512.3 |
| 3,941,698 | 3/1976 | Weis | 210/208 |
| 4,107,038 | 8/1978 | Weis | 210/801 |
| 4,519,907 | 5/1985 | Rooney | 210/523 |

FOREIGN PATENT DOCUMENTS 633822 1/1962 Canada .................... 210/801

Primary Examiner—Richard V. Fisher
Assistant Examiner—Linda Evans
Attorney, Agent, or Firm—Dressler, Goldsmith, Shore, Sutker & Milnamow, Ltd.

[57] ABSTRACT

A grit selector having an upper settling chamber and a lower grit storage chamber. The settling chamber communicates with the grit storage chamber through an opening in a transition surface therebetween. An influent flume directs influent liquid directly into a lower portion of the settling chamber. An effluent flume withdraws effluent liquid from an upper portion of the settling chamber. The influent flume and effluent flume have a common centerline with the effluent flume being positioned at an elevation above the influent flume. A baffle member extends into the settling chamber for directing the influent liquid stream outwardly towards a lower portion of the periphery of the settling chamber.

10 Claims, 3 Drawing Sheets

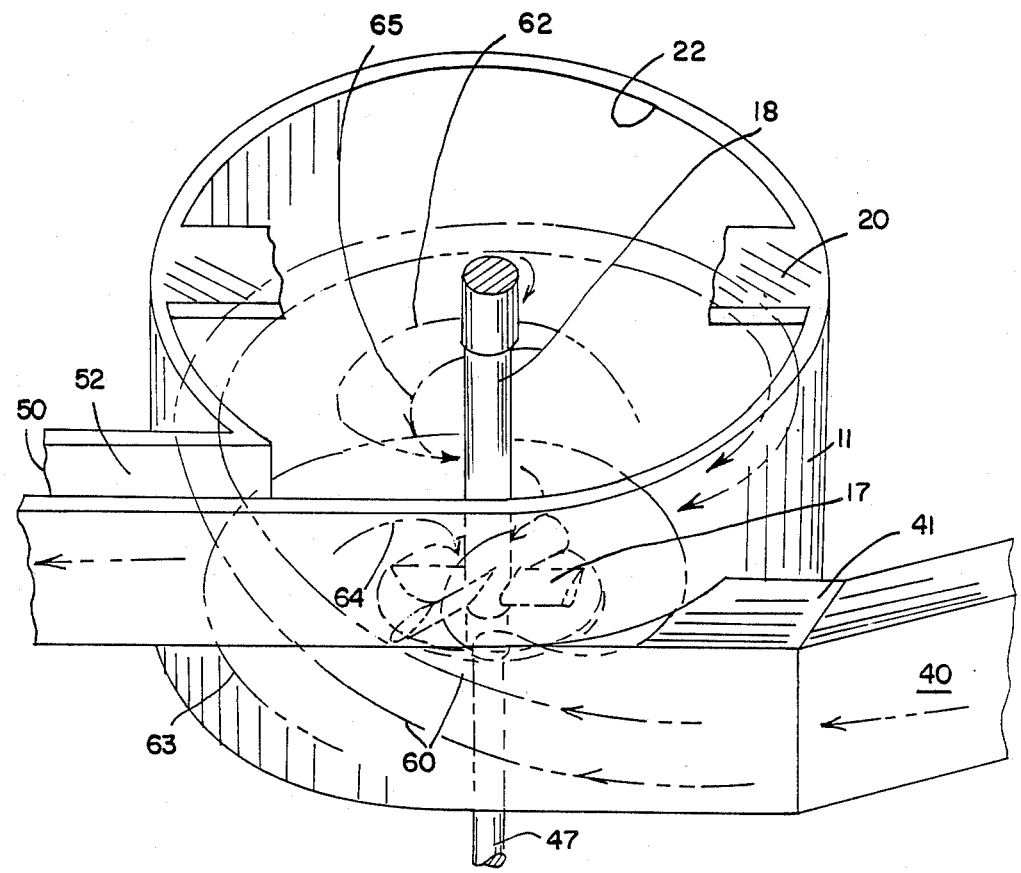

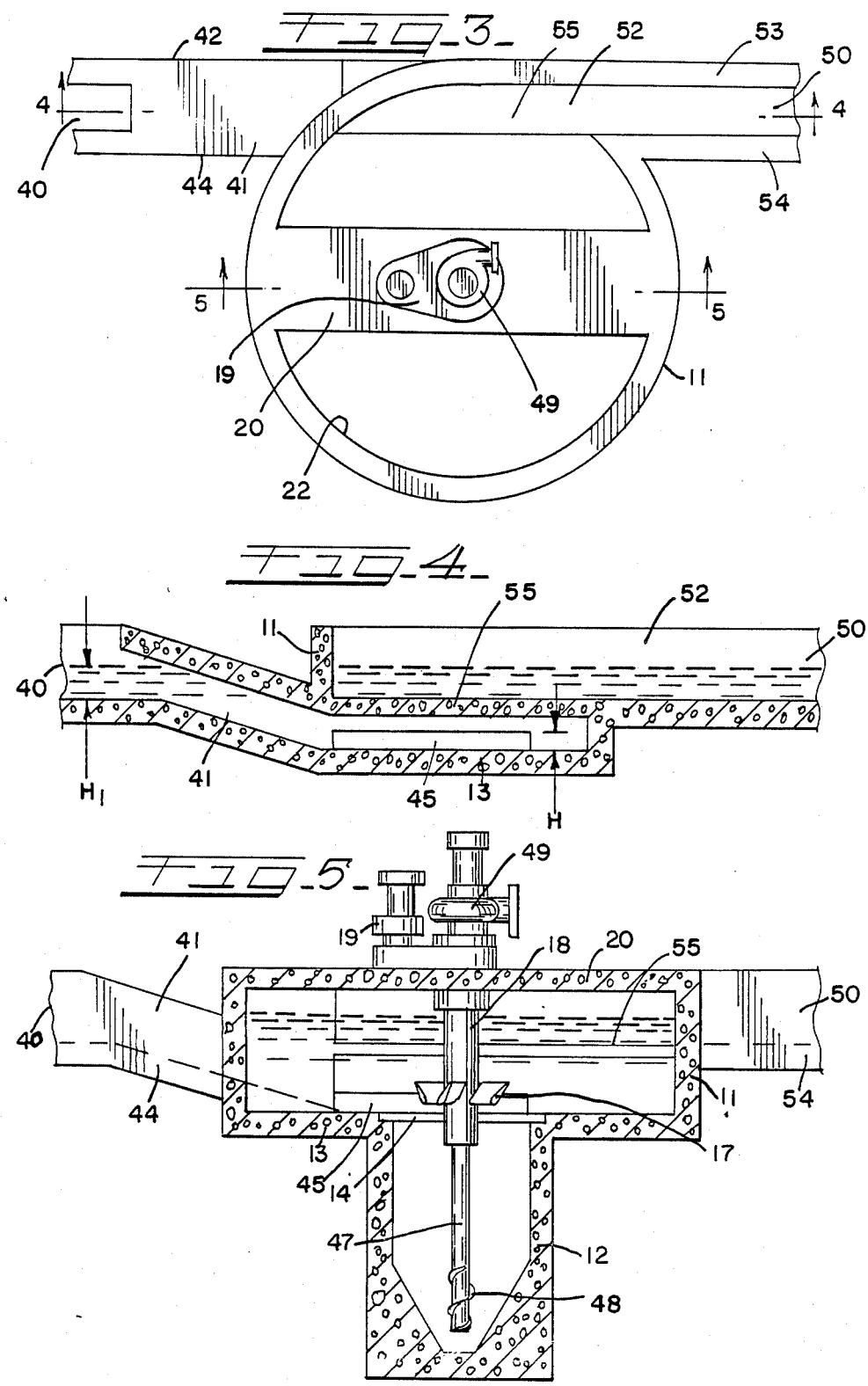

APPARATUS FOR REMOVING GRIT

TECHNICAL FIELD

The present invention relates to a grit selector or trap for selectively removing sand and grit from a flowing stream of water.

BACKGROUND OF THE INVENTION

Grit is one of the most unpredictable and difficult materials a sewage treatment plant must handle. Grit can be defined as the heavy mineral matter present in sewage. It is principally made up of sand and soil, but frequently contains cinders, coffee grounds, seeds, corn, and other coarse sediment which reaches a sewage disposal plant. It is desirous to remove this material as it cannot be treated, reduced in size, or eliminated by treatment methods. It presents a problem to waste treatment as it is hard and abrasive. It wears pumps and other mechanical devices. It is heavy and accumulates in clarifiers, treatment basins, digesters, etc., where it must often be removed by hand.

Grit removal devices of various designs have been proposed to remove grit from a flowing stream of water. One such grit trap device, which has been very commercially successful, is disclosed in U.S. Pat. No. 3,941,698 to Frank G. Weis, which patent is assigned to the same assignee as the present invention. This grit trap device includes an upper settling chamber and a lower grit storage chamber. The settling chamber, being of large diameter, communicates with the storage chamber through a relatively small opening in a substantially flat transition surface therebetween. Rotating paddles positioned within the settling chamber, a short distance above the transition surface, cause the flow of liquid entering the settling chamber adjacent the outer periphery to rotate about the chamber as a forced vortex resulting in an upward spiral flow which urges the settled particles across the transition surface towards the opening. The heavier settled particles fall through the opening into the storage chamber and the lighter organic particles rise in the spiral flow. The contents in the storage chamber are lightly air scoured prior to removal to cause any organics therein to be lifted out of the storage chamber and returned to the settling chamber.

A similar type of grit removal device as the one discussed hereinabove is disclosed in U.S. Pat. No. 4,107,038 to Frank G. Weis, which patent is also assigned to the same assignee as the present invention. In this patent, a ramp is provided in communication with the flume portion of the inlet trough to cause grit to follow the ramp down towards the transition surface. A baffle is also positioned in the settling chamber against which the rotating liquid impinges to deflect the liquid downwardly into a generally toroidal flow pattern that spirals around the periphery of the settling chamber. The toroidal motion of the liquid moves the grit on the transition surface towards the center opening.

The above-described prior art devices operate on the forced vortex principle. In these devices the head at the periphery of the settling chamber is higher than at the center of the settling chamber. This causes liquid to flow down the wall of the settling chamber to the bottom thereof and across the bottom to the point of lower head at the center thereof. It is this transverse circulatory flow pattern which permits the device to work. The particulate matter in suspension must follow this path to reach the bottom of the settling chamber and be carried to the center of the transition surface to the storage chamber. This takes some time and some of the particulate matter may not travel the full circuit before it is caught in the flow passing out the effluent, which results in a lowering of grit removal efficiency. The influent flume and the effluent flume of the above-described devices are at right angles to each other and in most installations require a 90° bend to get them back in line.

SUMMARY OF THE INVENTION

As discussed hereinabove, the prior art grit removal devices do not direct all of the sand and grit immediately to the bottom of the settling chamber causing a lower efficiency of separation. Also, the inlet and outlet flumes thereof do not lend themselves to small space requirement.

Briefly stated, the present invention is directed to improve upon the above-described grit removal devices by causing the sand and grit in the influent stream to come in contact with the bottom of the settling chamber and confine their movement to a plane parallel to the bottom of the chamber and in close proximity to the transition surface. Also the influent and effluent flumes are arranged so that they have the same centerlines.

More specifically, in accordance with the present invention the influent stream is directed into a lower portion of the settling chamber along the outer periphery thereof. A baffle member is positioned in a lower portion of the settling chamber for directing the lower portion of the influent stream towards the periphery of the settling chamber and thereby preventing the spreading thereof across the floor of the settling chamber. The influent flume and the effluent are substantially parallel to one another, with the effluent flume being elevated above the influent flume. As will be discussed hereinbelow, the flow patterns within the settling chamber are not a forced vortex and the settling solid particulates substantially avoid the influence of the effluent stream and are not affected by the exit velocity. This results in an increased solids removal efficiency.

DESCRIPTION OF THE DRAWING

FIG. 2 is a perspective schematic representation of the settling chamber of the invention showing the flow patterns therein.

FIG. 3 is a top plan view of the grit separator as shown in FIG. 1.

FIG. 4 is a sectional view taken along line 4—4 in FIG. 3.

FIG. 5 is a sectional view taken along line 5—5 in FIG. 3.

DESCRIPTION OF A PREFERRED EMBODIMENT

Figure 1:
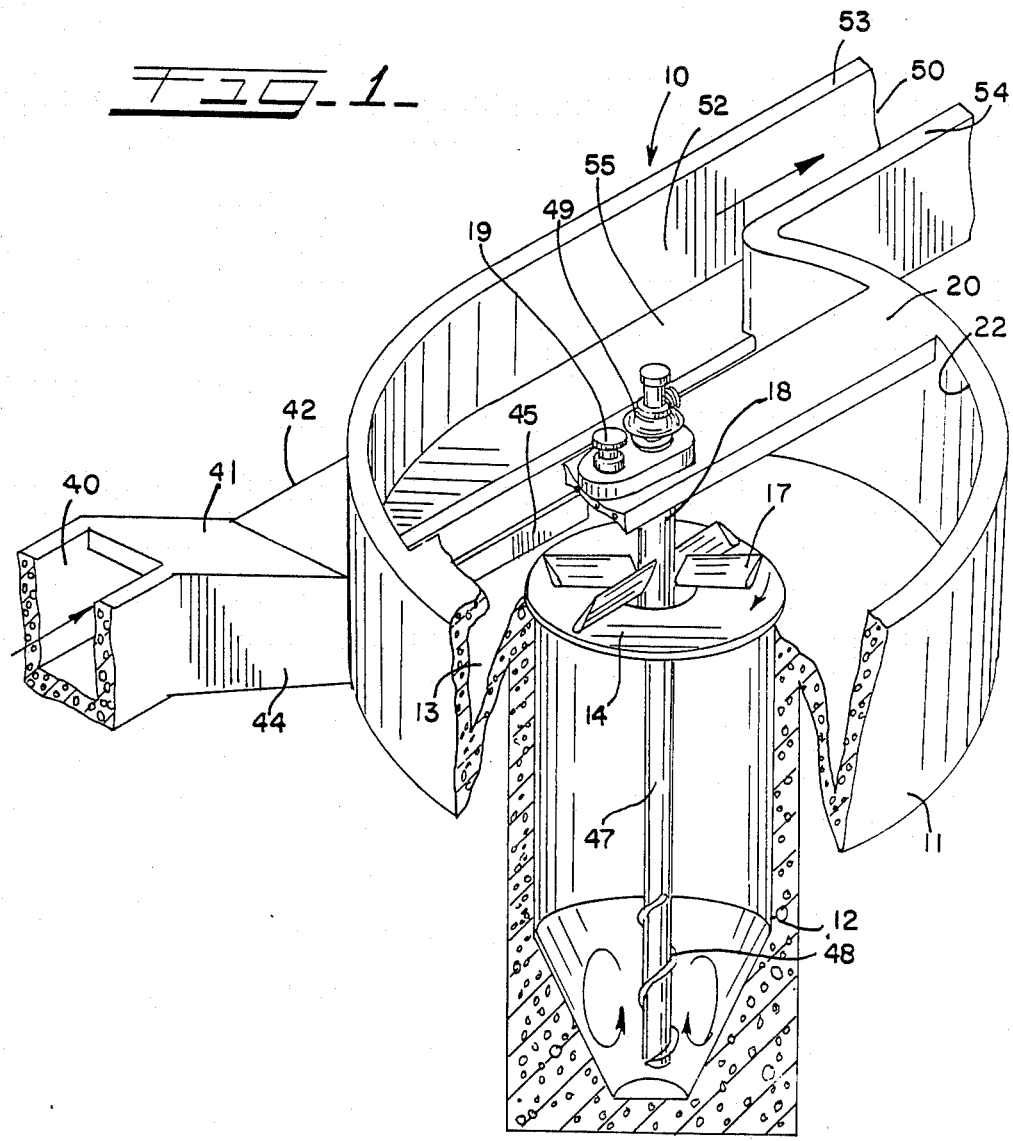
FIG. 1 is a perspective view, partially broken away, illustrating a grit removal device constructed in accordance with the present invention.

The drawing shows an apparatus 10 for separating grit from incoming liquid sewage in accordance with the present invention. A right circular cylindrical settling chamber 11 is disposed immediately above and concentric with a cylindrical grit storage chamber 12 of a lesser diameter. A substantially flat transition surface or floor 13, including a removable plate 14 centered in chamber 12, separates chambers 11 and 12. A circular opening 15 in the center plate 14 permits communication between chambers 11 and 12. The surfaces of apparatus 10 defining chambers 11 and 12 may be made from concrete or steel.

A multi-bladed propeller 17 is mounted on a hollow cylindrical shaft 18 for rotation about a vertical axis centered in opening 15, the diameter of shaft 18 being substantially less than that of opening 15. The upper portion of shaft 18 is connected to a conventional variable speed gear box and motor assembly 19 supported on a platform 20 for rotating propeller 17 at various speeds. The construction of propeller 17 and its attachment to shaft 18 is preferably substantially the same as the propeller construction as shown and described in U.S. Pat. No. 4,107,038, which disclosure is herein incorporated by reference. However, the blades are preferably shorter in length so as to cause rotation at a higher tip speed. In accordance with a preferred embodiment of the invention, the blades are approximately thirty-two inches in diameter for settling chamber diameters of seven to twenty-eight feet.

An inlet trough 40 has a downwardly extending influent flume portion 41 to introduce an influent liquid stream directly into a lower portion of settling chamber 11. Flume portion 41 has an outer wall 42 that tangentially intersects the lower portion of settling chamber 11 so as to cause the incoming influent liquid stream to flow tangentially into chamber 11. A baffle member 45 is positioned within chamber 11 and extends upwardly from floor 13. Baffle member 45 extends into chamber 11 in a substantially common vertical plane to an inner wall 44 of flume portion 41 so as to direct the influent stream towards a lower portion of the peripheral wall 22 of chamber 11 and thereby precluding the influent stream from spreading inwardly across floor 13. Baffle member 45 is preferably of a height (H) approximately equal to about twenty-five percent of the height of the liquid flowing through inlet trough 40 at maximum flow ($H_1$). Baffle member 45 preferably extends into chamber 11 a distance such that the included angle between imaginary lines from the center axis of chamber 11 to the outer end of baffle member 45 and the center axis to the inner end of baffle member 45 is approximately sixty degrees.

An outlet trough 50 has an effluent flume portion 52 which extends into an upper portion of settling chamber 11 for removing an effluent liquid stream from an upper portion of chamber 11 adjacent its outer periphery. Influent flume portion 41 and effluent flume portion 52 are generally parallel to one another with the effluent flume 52 being elevated above the influent flume 41. The outer wall 53 of the effluent flume is substantially parallel and in the same vertical plane as outer wall 42 and tangentially intersects the upper portion of settling chamber 11. The inner wall 54 of effluent flume 52 is preferably substantially parallel and in the same vertical plane as the inner wall 44 of influent flume 41. The floor 55 of effluent flume 52 extends into settling chamber 11 such that the outer edge thereof contacts the peripheral wall 22 of chamber 11 at an intermediate elevation between the upper and lower portions of chamber 11. The points of intersection between flumes 41 and 52 and the settling chamber 11 are preferably spaced apart by about 270° in the direction of liquid flow within chamber 11, as shown in FIG. 1. The flow path of the liquid stream within chamber 11 is approximately 450° during its flow path from its entry through the influent flume 41 and its exit through the effluent flume 52.

The preferred construction of grit storage chamber 12 is substantially the same as the grit storage chambers as shown and described in U.S. Pat. Nos. 3,941,698 and 4,107,038, which disclosures are herein incorporated by reference. An air lift discharge pipe 47 extends downwardly from shaft 18 towards the bottom of chamber 12. Means such as a turbo pump (49) are provided to lift settled solid particles from the bottom of chamber 12 through pipe 47 for removal in a suitable manner. In accordance with a preferred embodiment of the invention, a helix flight 48 may be provided to rotate with discharge pipe 47 to keep the settled solid particles from compacting on the bottom of chamber 12.

The description of the operation of the apparatus 10 in accordance with the invention, which hereinbelow follows, points out, in addition to the method and theory of operation, a disclosure of various optimum relationships which optimize its performance.

Water or sewage from which solid grit particles are to be removed is introduced into settling chamber 11 through inlet trough 40 and influent flume portion 41 as an influent stream, as indicated between broken lines 60 in FIG. 2. The flow of the influent stream is directed downwardly as it passes through influent flume portion 41 and thereby enters a lower portion of settling chamber 11. The flow of the influent stream is partially constrained by baffle member 45 which directs the influent stream towards the peripheral wall 22 of chamber 11 and prevents the flow from spreading across floor 13. As the flow of the influent stream moves around the peripheral wall, the width of the stream is narrowed by centrifugal force as it flattens against peripheral wall 22, thereby increasing its velocity as it moves around the chamber 11. As the liquid stream flattens against peripheral wall 22, liquid is drawn in to fill the void. This liquid is drawn from the liquid in the center core area of chamber 11 as is illustrated by broken line 62 in FIG. 2. This streamline moves rapidly downward as it passes around the chamber 11, resulting in a drop in velocity at the upper liquid surface and an increase in velocity at the bottom of the center core area. This is aided by the viscous drag of the entering influent stream.

As the influent stream rotates around the settling chamber 11 in the direction indicated by the arrow in FIG. 2, grit and certain organics settle towards the bottom of chamber 11 onto transition surface or floor 13 and grit-free liquid moves upwardly and exits through effluent flume portion 52. As this flow passes out through flume 52, the velocity of the stream along the peripheral wall 22 drops to zero. Accordingly, the hydraulic flow pattern of the influent stream is precluded from being a forced vortex. This drop in velocity increases the flattening of the influent stream to fill this void in velocity and further tends to draw the streamline 62 downwardly towards floor 13.

The solid particles in suspension are carried near the floor 13 and as they settle they contact the floor. The settled particles are urged around the floor and radially inwardly where they drop through opening 15 and pass into grit storage chamber 12. The influent liquid entering chamber 11 also moves around the peripheral wall of chamber 11 and is forced to the center by baffle member 45 in a streamline adjacent floor 13, as is illustrated by broken line 63 in FIG. 2. The solid particulates settling in this stream contact the floor 13 and move around chamber 11 and radially to opening 15. Solid particulates in the influent stream settle below the portion of floor 55 extending into chamber 11. The flattening of the influent stream against the peripheral wall of chamber 11 also causes a thin stream of liquid to move down the wall as it passes around the chamber and to move across floor 13 towards the center core area where it moves upwardly to enter the center core flow.

The rotating propeller 17 is caused to rotate at a higher speed than the velocity of the liquid rotating in chamber 11 in the same direction as liquid flow. This forces the liquid in the center core to flow upwards around the axis of shaft 18, as shown by broken line 65 in FIG. 2. This increased flow also causes the radial flow along the floor to increase and alters the flow to the streamlines as shown by broken line 64 in FIG. 2. The increased velocity across the floor increases the movement of the heavier particles towards opening 15. The lighter particles and organics are picked up by the increased flow and are carried up with the center core streamline 65 and are subsequently carried out with the effluent stream.

As alluded to hereinabove, the prior art grit removal devices operate on the forced vortex principle. In these devices the head at the periphery of the settling chamber is higher than at the center of the settling chamber. This causes liquid to flow down the peripheral wall of the settling chamber to the floor and across the floor to the point of lower head at the center. The solid particulate matter in suspension must follow this path to reach the floor and be carried to the center for direction to the grit storage chamber. This flow pattern takes time and some of the solid particulate matter does not travel the complete circuit before it is caught in the flow passing out the effluent flume. This results in a lowering of the solid particulates removal efficiency.

In contrast, the grit removal device of the present invention, as described hereinabove, directs all of the influent flow into a lower portion of the settling chamber where the bulk of the solid particulate matter remains. The flow patterns within the settling chamber are such that the solid particulates do not have to settle as far to avoid the influence of the effluent stream and thus are not affected by the exit velocity thereof. The present invention has an inner core stream 62 which rapidly moves downwardly towards the floor and carries the solid particulates with it towards the floor. The flow pattern within the settling chamber is not a forced vortex.

The propeller in the present invention is smaller in diameter and rotates at a higher rate of speed than in the prior art grit removal devices. The purpose of the propeller in accordance with the invention is to pump liquid across the floor to propel the settled solid particulates towards the hole in the center of the floor for transmission thereof to the grit storage chamber. In contrast, the purpose of the propeller in the prior art grit selector devices is to reinforce the roll of the liquid in the settling chamber.

The effluent flume in accordance with the invention has its centerline the same as the centerline of the influent flume. This facilitates installation of the device.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Apparatus for separating grit from a liquid stream while retaining organic solids therein, comprising: means defining a cylindrical settling chamber; means defining a cylindrical grit storage chamber having a smaller diameter than said settling chamber, and disposed immediately below said settling chamber; a transition surface separating said settling chamber and said storage chamber, said transition surface including means defining a centrally disposed opening therethrough permitting communication between said settling chamber and said storage chamber; an influent flume for introducing an influent liquid stream directly into a lower portion of said settling chamber along the outer periphery thereof; an effluent flume for removing an effluent liquid stream from an upper portion of said settling chamber along the outer periphery thereof, said effluent flume being spaced from said influent flume by a distance equal to at least a substantial portion of the circumference of said settling chamber in the direction of liquid flow; a baffle means positioned within said settling chamber for directing the influent liquid stream entering said settling chamber outwardly towards a lower portion of the periphery of said settling chamber and preventing the spreading thereof across said transition surface; and propeller means mounted within said settling chamber above said transition surface for rotation about a substantially vertical axis in the same direction as liquid flow within said settling chamber at a sufficient rate to cause a radial flow pattern across said transition surface of increased velocity so as to cause heavier particles to pass through said opening into said grit storage chamber and lighter particles to be lifted upwardly within a center portion of said settling chamber.

2. The apparatus as defined in claim 1 wherein said influent flume is positioned below said effluent flume.

3. The apparatus as defined in claim 1 wherein said influent flume is substantially parallel to said effluent flume and has a common centerline therewith.

4. The apparatus as defined in claim 1 wherein said influent flume includes an upstanding outer wall which intersects a lower portion of said settling chamber essentially tangentially thereto for tangentially directing an influent liquid stream into said settling chamber.

5. The apparatus as defined in claim 1 wherein said effluent flume has a floor portion which extends into an intermediate portion of said settling chamber adjacent a portion of the periphery thereof.

6. The apparatus as defined in claim 1 wherein said baffle means extends into said settling chamber in a plane substantially common to the plane of an inner wall of said influent flume.

7. The apparatus as defined in claim 6 wherein said baffle means extends upwardly from said transition surface a distance approximately equal to twenty-five percent of the height of the liquid flow through said influent flume at maximum flow.

8. The apparatus as defined in claim 6 wherein said baffle means extends into said settling chamber a distance such that the included angle between imaginary lines from the settling chamber center axis to respective ends thereof is approximately sixty degrees.

9. The apparatus as defined in claim 1 wherein said influent flume and effluent flume are spaced such that the influent liquid stream travels a distance greater than 360° within said settling chamber prior to entering said effluent flume as the effluent stream.

10. The apparatus as defined in claim 1 wherein said propeller means is mounted to a substantially vertical shaft which extends downwardly through said opening into said grit storage chamber, said shaft having a helix flight means at the lower end thereof to keep settled particles from compacting on the bottom of said grit storage chamber.

* * * * *